Figure 3:
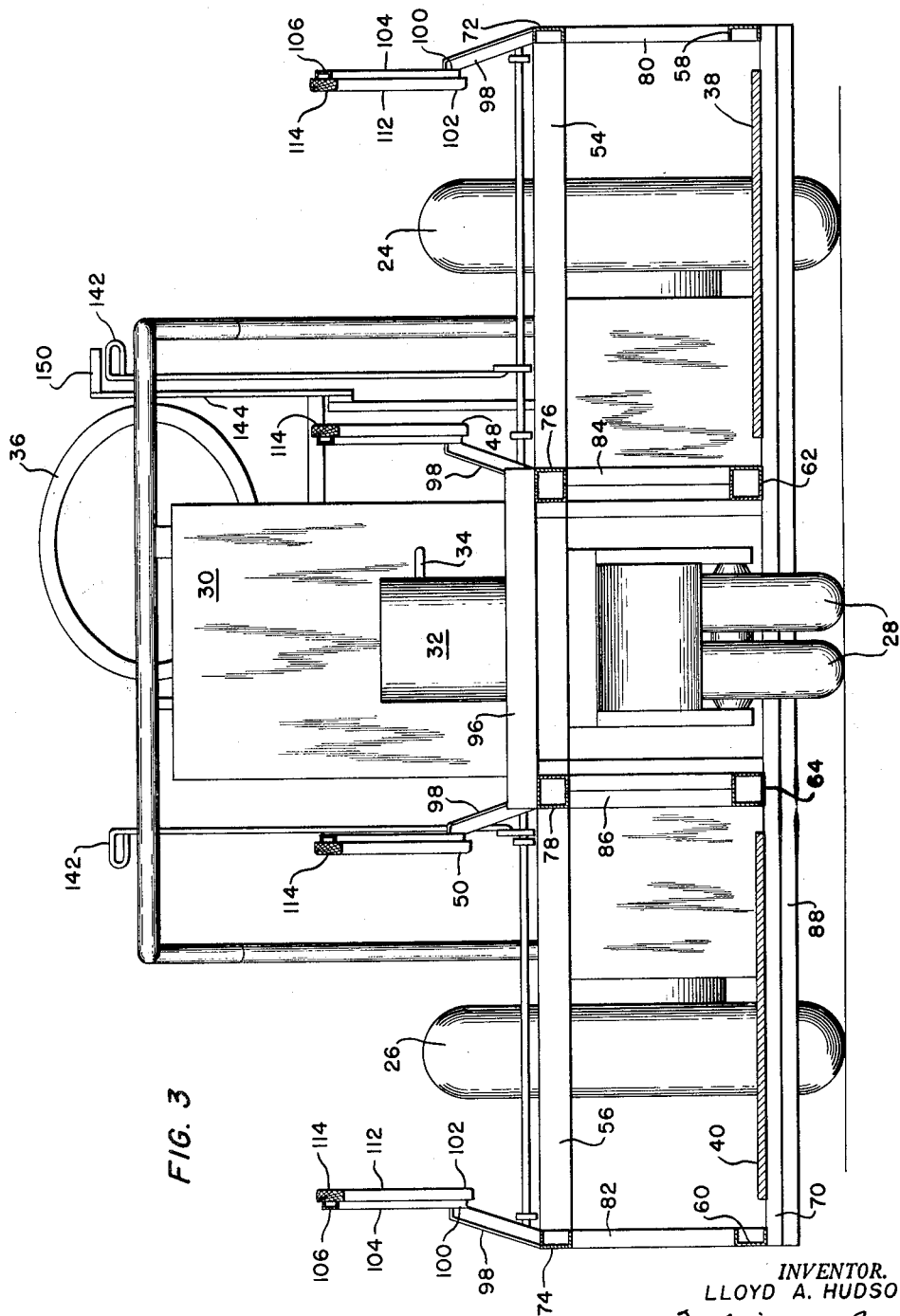

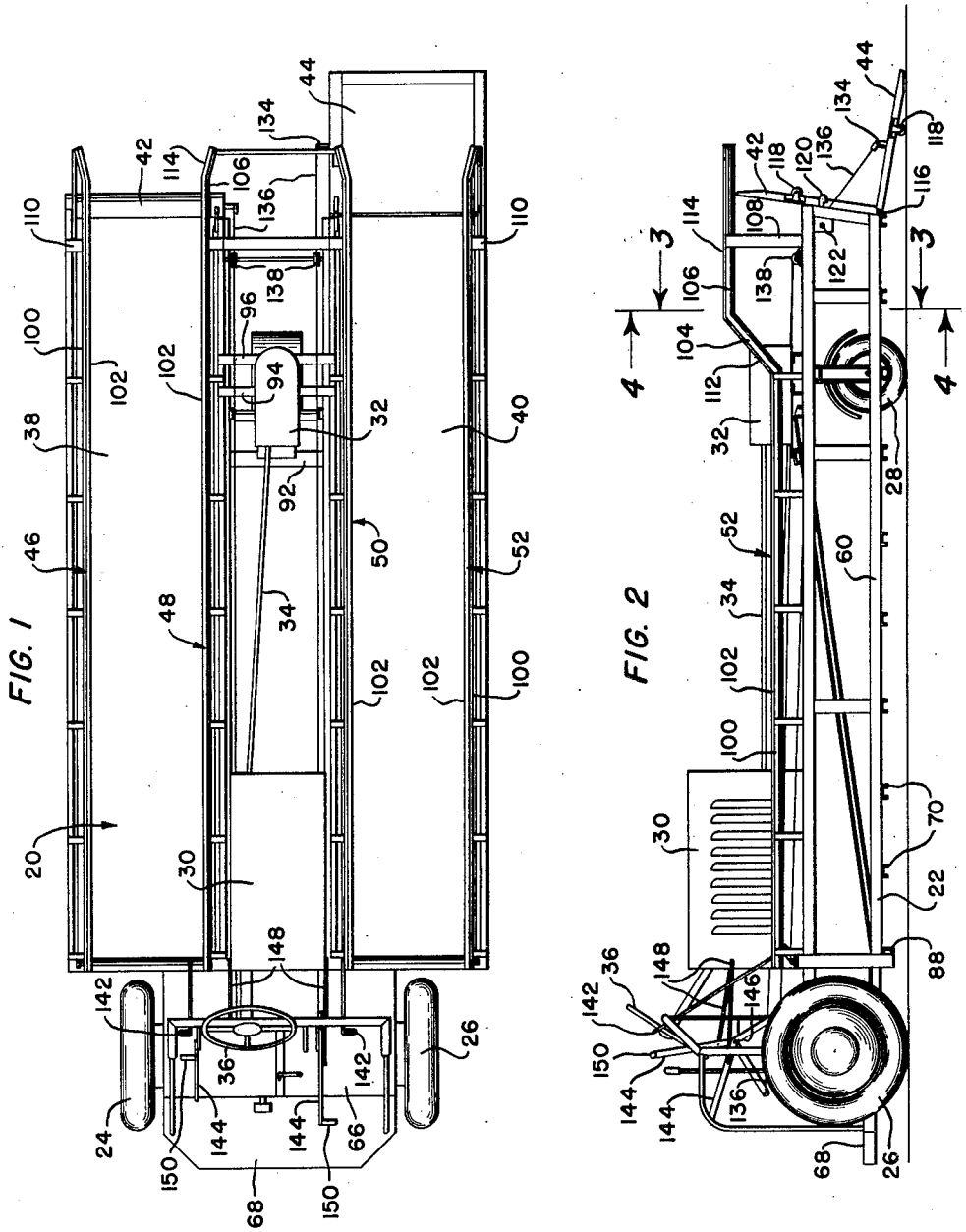

INVENTOR.
LLOYD A. HUDSON

BY Fulwider, Patton
Rieber, Lee & Utecht
ATTORNEYS

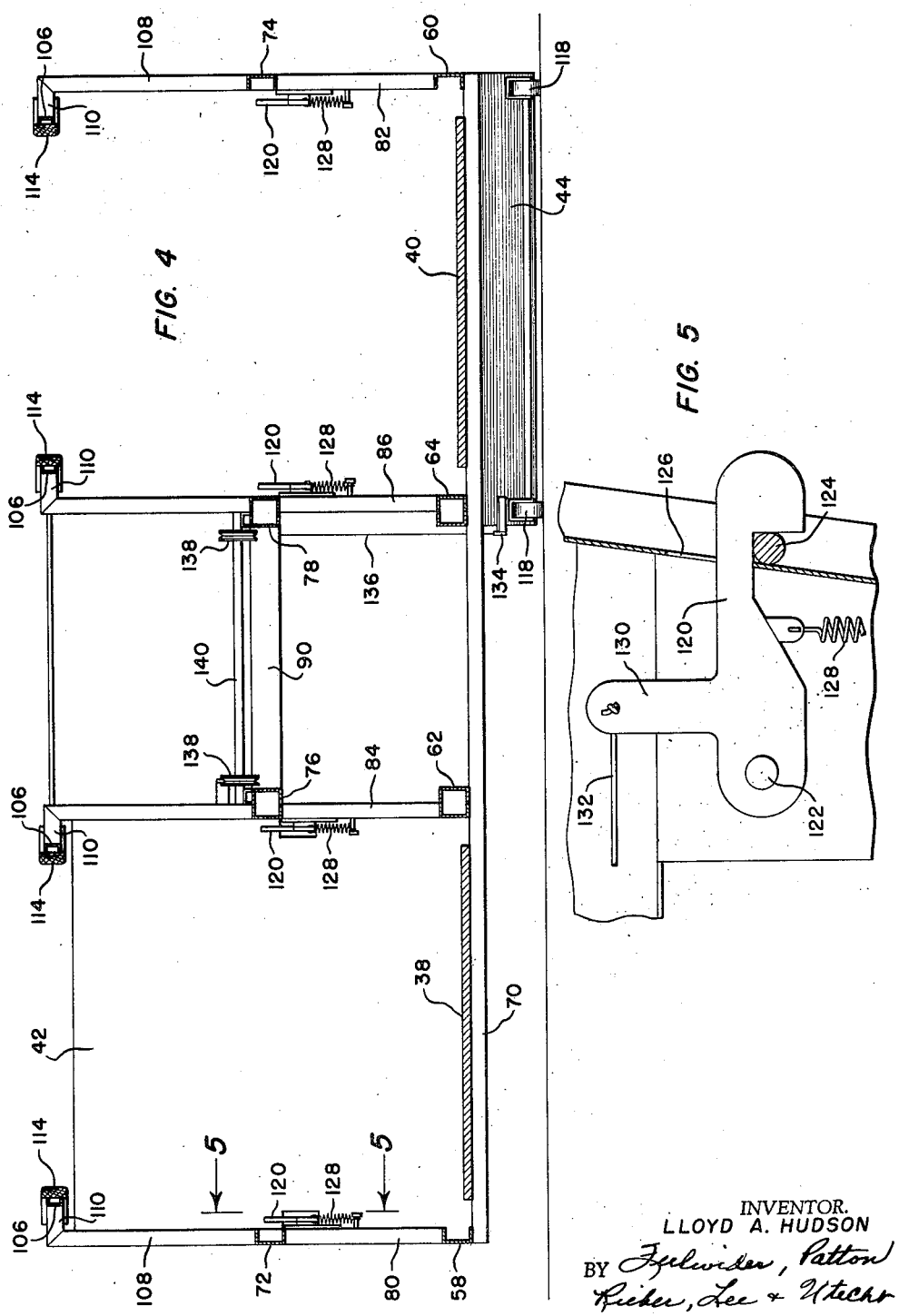

United States Patent Office 3,193,120
Patented July 6, 1965

3,193,120
SHOPPING CART PICK-UP MACHINE
Lloyd A. Hudson, 325 54th St., San Diego 14, Calif.
Filed Dec. 10, 1962, Ser. No. 243,281
4 Claims. (Cl. 214—85)

The present invention relates to a machine for picking up and moving carts such as the wheeled carts employed in supermarkets.

The machine of the present invention includes a carriage which is driven by a motor. It includes an elongated chassis or frame which is provided with one or more elongated platforms for bearing and moving a plurality of wheeled carts. A ramp is pivoted to the front end of each platform. This ramp can be lowered so that the free end rests near or directly on the ground forwardly of the platform, so that wheeled carts can be rolled readily upward thereon and onto the platform.

Rails are arranged upwardly of and alongside of the platform for guiding the carts as they are moved onto and off of the platform. A stop is provided at the rear end of the platform for determining the extent of rearward movement of the carts. Also, the ramp can be swung upwardly from its ramp functioning position to a vertically extending position whereby it functions as a gate for preventing forward movements of the carts which are on the ramp.

When the ramp functions as a gate, it leans forward. However, a latch is provided for retaining the ramp in gating position. This latch can be actuated by the operator of the machine while he is on the operator's support. Also, mechanism is provided for lifting the ramp, i.e. moving it from its ramp functioning position to its gating position. This mechanism also provdes for easing the lowering of the ramp. This mechanism is controlled and manipulated by the operator of the machine when he is stationed on the operator's support.

The operator's support is arranged at the rear of the machine for more ready observation of the entire machine and the ready observation of the moving and parked automobiles present in the adjunct parking lot of the supermarket.

Other features and the advantages of the present invention will be apparent from the following description, reference being had to the accompanying drawings wherein a preferred embodiment of the invention is illustrated.

In the drawings:
FIG. 1 is a top plan view of the machine;
FIG. 2 is a right side view of the machine;
FIG. 3 is a sectional view taken along line 3—3 of FIG. 2, but on a larger scale;
FIG. 4 is a sectional view taken along line 4—4 of FIG. 2, but on a larger scale; and
FIG. 5 is a fragmentary view looking in the direction of arrows 5—5 of FIG. 4, but on a larger scale.

Referring more in detail to the drawings, the machine 20 includes basically, a main frame or chassis 22, which is supported by a pair of rear wheels 24 and 26, and a pair of front wheels 28 which latter operate in unison. The rear wheels are driven by a motor 30, in the form of an internal combustion engine, through suitable transmission mechanism (not shown). The front wheels are mounted for oscillatory movement about a vertically extending axis, and are turned through gearing contained in a housing 32. A shaft 34 is used for manipulating the gearing in the housing 32, which shaft is also connected through suitable mechanism with the steering wheel 36.

The main frame 22 includes two horizontally extending platforms 38 and 40. The front ends of these platforms have ramps 42 and 44 pivotally attached thereto. The ramp 44 is shown in its ramp functioning position, while the ramp 42 is shown in a gate functioning position.

Rails 46 and 48 are disposed upwardly and along opposite sides of the platform 38, and similar rails 50 and 52 are disposed upwardly and along opposite sides of the platform 40. The frame 22 also includes rear metal members 54 and 56, which provide stops for limiting the extent of rearward movement of the carts on the platforms 38 and 40.

When the ramps are lowered as shown with respect to ramp 44, the wheeled carts can be rolled onto or off of the ramp. The rails 50 and 52 guide the carts upon the platform, and the rear members 54 and 56 limit the rearward movement of the carts. As the platform is filled with carts, the ramp is raised from the position shown at 44, to the position shown at 42, whereby the ramp functions as a gate for the front end of the platform. Thus the two rails, the rear member 54 and the gate 42 function to confine the carts upon the platform 38.

Referring more in detail to the frame 22, the lower part of the frame comprises elongated C-shaped angle iron members 58 and 60, which are coextensive with the platforms 38 and 40, iron member 58 being the left side of the frame, and iron member 60 being the right side of the frame. The lower part of the frame also includes two pairs of elongated C-shaped angle irons which are welded to one another to form a square shaped angle iron. These irons are shown at 62 and 64 and are coextensive with the iron members 58 and 60 at the front, and extend rearwardly of the platform to provide supports for a platform 66 which overlies the transmission mechanism including the axles for the driving wheels 24 and 26, and to provide a platform 68 rearwardly and below platform 66, which platform 68 provides an operator's support.

These angle irons 58, 60, 62 and 64 are bridged by C-shaped angle irons 70 which are welded to the under side of the rearwardly extending angle irons. Angle irons 72, 74, 76 and 78, similar to angle irons 58, 60, 62 and 64, respectively, are disposed, respectively, directly above said angle irons 58, 60, 62 and 64, and are connected with one another through vertically extending angle irons 80, 82, 84 and 86. The rear ends of the lower-most angle irons 58 and 60 are welded to cross angle irons 88. Angle irons 88 are also welded to the under side of these square shaped angle irons 62 and 64. The rear member 54 is also an angle iron, and one end is welded to the end of angle iron 72, and the other end is welded to the side of angle iron 76. Member 56 is also an angle iron and it is welded to the rear end of angle iron 74 and to the side of angle iron 78. An angle iron 90, square in cross section, is welded to the angle irons 76 and 78 near the front end of said latter angle irons 76 and 78. Thus, it is apparent that a sturdy frame or chassis has been provided. The gear housing 32 is carried by latterly extending angle irons 92, 94 and 96, which are welded to angle irons 76 and 78.

The motor 30 is carried by angle irons (not shown) which are in turn welded to the angle irons 76 and 78. The platforms 38 and 40 are carried by and fixed to the top sides of the laterally extending angle irons 70.

The upper horizontally extending angle irons 72 and 76 of the frame 22, carry upwardly extending struts 98. These struts also extend inwardly toward one another. They are welded to the upper side of said angle irons. The upper ends of these struts carry angle iron rails 100. These rails are arranged parallelly of the angle irons 72 and 76, and carry wood rails 102. These wood rails 102 confront one another, are disposed above the platform 38, and are employed for guiding the carts upon said platform. Like struts and rails are carried by the upper angle irons 74 and 78. The foremost struts 98 carry upwardly and forwardly extending angle iron rails 104, which merge into forwardly extending rails 106. The rail portions 106 are braced by struts 108, each having an inwardly extending portion 110. The lower ends of the struts are welded to irons 72, 74, 76 and 78.

The angle iron rails 104 and 106 carry wood rails 112 and 114, respectively. As is seen more clearly in FIG. 1, the rails 106 and 114 diverge forwardly to provide an enlarged opening for guiding the carts into alignment. Like angle irons 104 and 106, and wood rails 114 are carried at the forward end of the rails 74 and 78. By confining the carts inwardly at the top, through the rails 114 and 102, then obviously the lower end of the cart is also confined, whereby the wheels of the cart cannot engage any part of the sides of the frame. In this manner it is necessary only to push the carts rearwardly or forwardly, as the case may be, with the assurance that the wheels will not bind with any parts of the frame.

The ramps 42 and 44 are each pivotally connected by pins 116, with the foremost transversely disposed angle irons 70, whereby the ramps can function as such, or function as a gate for closing the front end of the platform. The figures show the ramp 44 as functioning as such, while the ramp 42 is functioning as a gate. Preferably, the ramps are provided with rollers 118 so that they can be moved across the ground readily while functioning as a ramp.

The ramps are latched in gate position by latches 120, which are pivoted on pivot pins 122. The latches 120 cooperate with latch retainers 124, which are suitably attached to the front or under side of the ramps, there being holes 126 provided in the ramp through which the nose of the latch pins extends. Each latch is held in latching position by a spring 128. The latch 120 is provided with an arm 130, which in turn is connected with a cable 132. By pulling rearwardly on the cable 132, the latch is released from the retainer 124, whereby the ramp can be lowered. In the preferred embodiment, when the latch is in gate functioning position, it leans slightly forwardly, and when it is released, it will fall by gravity.

The rear or top side of the ramp is provided with a bracket 134 which is connected with a cable 136, one of these brackets and cables being provided for each of the platforms 38 and 40. These cables 136 pass over pulleys 138, carried by a shaft 140. This shaft is supported by suitable portions of the frame 22. The lowering of the ramp can be restrained by manipulating the cable 136, that is, releasing the cable slowly.

The cables 132 and 136 extend to the rear of the frame. The cables 132 are provided at their ends with handles 142, which, when pulled rearwardly, release the latch 120 from the latch retainer 124. Each of the cables 136 is connected with a bell-crank lever 144, which is suitably mounted on the pivot 146. A spring 148 is provided for each bell-crank lever which counteracts the weight of the ramp to minimize the energy necessary for lifting the ramp. When the top of the lever 144 is moved forwardly, the spring, being under tension, assists such forward movement in pulling the cable 136 rearwardly and lifting the ramp.

The handles 142 and the handles 150 for the bell-crank levers 144 are accessible to the operator when he is standing on the operator's support or platform 68. Each of the platforms is adapted to hold a large number of carts.

The machine here shown is adapted to carry twelve carts on each of the platforms. The carts are usually scattered about the parking lot, left there by the customers. In operating the device, the attendant will gather a few of these carts, and after lowering a ramp, push the same onto a platform 38 or 40, and then move the machine to another gathering of these carts. As the platforms are filled, the ramp is pulled from its ramp position to its gate position, whereby the carts are confined on the platform, and then the machine can be moved and the carts carried to the usual storage space at the entrances of the market. Heretofore, when the carts were gathered and rolled manually to the stations at the entrances to the market, six men were required to do the same work that one man can do with the present machine.

While the form of embodiment herein shown and described constitutes preferred form, it is to be understood that other forms may be adopted falling within the scope of the claims that follow.

I claim:

1. A mobile machine for picking up and moving carts having wheels, such as those employed in markets, said machine comprising:
   (A) a carriage, said carriage including:
      (1) an elongated forwardly and rearwardly extending frame, said frame including:
         (a) a plurality of parallel disposed platforms, each adapted to support a plurality of said carts, said platforms being coextensive with and horizontally spaced from one another,
         (b) a pair of rails extending parallelly of the platforms for engaging upper parts of said carts,
         (c) transversely and horizontally disposed pivot means at the front ends of the platforms,
         (d) an operator's support,
         (e) rear stops on each platform for the carts;
      (2) ground wheel means for the frame, certain of said wheel means being disposed forwardly of certain other of said wheel means;
      (3) means carried by the frame for journalling said front wheel means for oscillatory movement about a vertically extending axis whereby the machine can be guided, said front wheel means being disposed between a pair of said platforms;
      (4) a motor for driving the rear wheel means, said motor being disposed between the pair of rails;
      (5) ramp means pivotally carried by said pivot means, said ramp means being pivotally movable from a vertically extending position adjacent said rails to a position in which the free end thereof engages the ground,
      (6) means accessible to the operator when on the operator's support for raising said ramp means from the second mentioned position thereof, to the first mentioned position thereof;
      (7) and a shaft for oscillating the front wheel means.

2. A mobile machine as defined in claim 1, characterized in that the ramp means includes a ramp for each platform and further characterized in the means for raising the ramp means includes separate means for each ramp.

3. A mobile machine as defined in claim 1, characterized in that the motor is disposed near the rear of the frame and the operator's support lies rearwardly of the motor, the operator's support is disposed at the rear of the frame and that the oscillatable shaft is for the front wheel means.

4. A mobile machine as defined in claim 3, characterized in that the front wheel means is disposed rearwardly of the fronts of and between the platforms.

References Cited by the Examiner

UNITED STATES PATENTS

| | | | | |
|---|---|---|---|---|
| 2,702,134 | 2/55 | Alphin | 214— | 83.1 |
| 2,727,781 | 12/55 | D'Eath | 214— | 85 X |
| 2,750,226 | 6/56 | Ash | 296— | 61 |
| 2,788,141 | 4/57 | Hendrix | 214— | 83.1 |
| 3,034,668 | 5/62 | Wicks | 214— | 83.1 |
| 3,051,336 | 8/62 | Felsten | 214— | 85 |
| 3,073,404 | 1/63 | Hudson | 296— | 3 X |

GERALD M. FORLENZA, *Primary Examiner.*

HUGO O. SCHULZ, *Examiner.*